United States Patent
Khachatryan et al.

(10) Patent No.: US 12,446,202 B2
(45) Date of Patent: Oct. 14, 2025

(54) FUNCTIONAL RF/EMF SHIELDING FILM AND DEVICE

(71) Applicants: Tigran Khachatryan, Redmond, WA (US); Razmig Keutelian, Burien, WA (US)

(72) Inventors: Tigran Khachatryan, Redmond, WA (US); Razmig Keutelian, Burien, WA (US)

(*) Notice: Subject to any disclaimer, the term of this patent is extended or adjusted under 35 U.S.C. 154(b) by 0 days.

(21) Appl. No.: 18/686,425

(22) PCT Filed: Mar. 13, 2023

(86) PCT No.: PCT/US2023/015135
§ 371 (c)(1),
(2) Date: Feb. 25, 2024

(87) PCT Pub. No.: WO2023/177638
PCT Pub. Date: Sep. 21, 2023

(65) Prior Publication Data
US 2024/0292585 A1  Aug. 29, 2024

Related U.S. Application Data

(60) Provisional application No. 63/319,299, filed on Mar. 12, 2022.

(51) Int. Cl.
*H05K 9/00* (2006.01)
*A45C 11/00* (2006.01)
*H01Q 1/52* (2006.01)
*H04M 1/02* (2006.01)

(52) U.S. Cl.
CPC ............ *H05K 9/0096* (2013.01); *A45C 11/00* (2013.01); *H01Q 1/526* (2013.01); *H04M 1/0266* (2013.01); *H05K 9/0094* (2013.01); *A45C 11/002* (2025.01)

(58) Field of Classification Search
CPC .................................................. H05K 9/0094
See application file for complete search history.

(56) References Cited

U.S. PATENT DOCUMENTS

| | | |
|---|---|---|
| 5,335,366 A | 8/1994 | Daniels |
| 5,336,896 A | 8/1994 | Katz |
| 5,367,309 A | 11/1994 | Tashjian |
| 5,657,386 A | 8/1997 | Schwanke |
| 5,726,383 A | 3/1998 | Geller et al. |
| 6,001,282 A | 12/1999 | Kanase |
| 6,075,977 A | 6/2000 | Bayrami |
| 6,095,820 A | 8/2000 | Luxon et al. |
| 6,184,835 B1 | 2/2001 | Chen et al. |
| 6,341,217 B1 | 1/2002 | Wong |

(Continued)

*Primary Examiner* — Hung V Ngo
(74) *Attorney, Agent, or Firm* — Dean A. Craine, P.S.

(57) ABSTRACT

Am RF/EMF radiation shielding device with a transparent film layer embedded or covered with radiation-blocking material configured to absorb or deflect RF/EMF/E3 F7 radiation with the ability to utilize the mobile device's touchscreen. Formed on the radiation-blocking material are partitions or gaps where the radiation blocking areas are absent. The partitions divide the radiation-blocking material into a plurality of isolated blocking areas. In one embodiment, the shielding device is a single film layer; in another, two or more film layers are stacked, registered, and separated by an insulated layer.

21 Claims, 7 Drawing Sheets

(56) References Cited

U.S. PATENT DOCUMENTS

| | | |
|---|---|---|
| 6,356,773 B1 | 3/2002 | Rinot |
| 6,359,213 B1 | 3/2002 | Long |
| 6,377,824 B1 | 4/2002 | Ingbir et al. |
| 6,404,403 B1 | 6/2002 | Kunz et al. |
| 6,505,036 B2 | 1/2003 | Zilberberg et al. |
| 6,515,223 B2 | 2/2003 | Tashjian |
| 6,603,981 B1 | 8/2003 | Carillo, Jr. et al. |
| 6,615,028 B1 | 9/2003 | Loke et al. |
| 6,624,432 B1 | 9/2003 | Gabower et al. |
| 6,628,784 B1 | 9/2003 | Montane Condemines |
| 6,708,047 B1 | 3/2004 | Miller et al. |
| 6,738,650 B1 | 5/2004 | Zhou et al. |
| 6,897,826 B1 | 5/2005 | Kunz |
| 8,270,929 B1 | 9/2012 | Koeppel et al. |
| 2001/0041545 A1 | 11/2001 | Liberman et al. |
| 2002/0009976 A1 | 1/2002 | Rashidi |
| 2002/0072337 A1 | 6/2002 | Teller |
| 2002/0097188 A1 | 7/2002 | Coloney |
| 2003/0176164 A1 | 9/2003 | Hefetz |
| 2003/0228843 A1 | 12/2003 | Mayer |
| 2004/0026100 A1 | 2/2004 | Mattson et al. |
| 2004/0198264 A1 | 10/2004 | Saur et al. |
| 2008/0014872 A1 | 1/2008 | Tucek et al. |
| 2010/0240421 A1 | 9/2010 | Sekora et al. |
| 2014/0262474 A1* | 9/2014 | Koeppel .................. A45F 5/02 174/376 |
| 2015/0061942 A1* | 3/2015 | Koyama ................ H05K 3/143 174/253 |
| 2021/0266388 A1* | 8/2021 | Giuliani .................. G02B 1/14 |
| 2023/0209787 A1* | 6/2023 | Parry .................. H05K 9/0094 361/816 |

\* cited by examiner

FUNCTIONAL RF/EMF SHIELDING FILM AND DEVICE

TECHNICAL FIELD

This invention pertains to devices that reduce the exposure to radio frequencies and electromagnetic fields (RF/EMF), and more particularly to such devices used with mobile devices that emit RF/EMF.

BACKGROUND ART

It is well known that mobile devices that communicate with cellular base stations or over WiFi emit RF/EMF radiation constantly when powered on. In addition, because RF/EMF radiation emitted from the body of a mobile device is omnidirectional, carrying or holding the mobile device near the user exposes the user to RF/EMF radiation.

Because RF/EMF radiation may be dangerous to animals, various devices have been developed to block or reduce RF/EMF radiation as taught in the following: U.S. Pat. Nos. 5,367,309, 5,335,366, 5,336,896, 5,657,386, 5,726,383, 6,001,282, 6,075,977, 6,095,820, 6,184,835, 6,341,217, 6,356,773, 6,359,213, 6,377,824, 6,404,403, 6,505,036, 6,515,223, 6,615,028, 6,624,432, 6,628,784, 6,603,981, 6,708,047, 6,738,650, 6,897,826, 8,270,929, US Publication No. 2001/0041545, U.S. Publication No. 2002/0072337, U.S. Publication No. 2002/0097188, U.S. Publication No. 2002/0009976, U.S. Publication No. 2003/0228843, U.S. Publication No. 2003/0176164, U.S. Publication No. 2004/0198264, U.S. Publication No. 2004/0026100, US Publication No. 2008/0014872, and US Publication No. 2010/0240421.

U.S. Pat. No. 8,270,929 teaches an RF shielding device for a mobile device that includes an RF-blocking screen material configured to fit over the display on a mobile device and a grounding structure that connects the RF-blocking screen material to the body of the mobile device. In one embodiment, the RF-blocking screen material is placed over the front surface of the mobile device. A ground structure, such as a metallic foil strip, is attached to the RF-blocking screen and contacts the sides of the mobile device. A frame is then placed over the front surface of the mobile device to hold the RF-blocking screen material and ground structure in place of the mobile device.

In a modification of the first embodiment shown in U.S. Pat. No. 8,270,929, a backplate made of RF-blocking screen material that blocks RF radiation from the rear surface of the mobile device. In a second embodiment, the grounding structure is a flap attached to one end of the RF-blocking screen material that folds over and contacts the sides of the mobile device. In a third embodiment, the RF-blocking screen and a backplate made of RF-blocking screen material are placed inside a case or pouch designed to receive the mobile device. The edges of the RF-blocking screen and the backplate are configured to contact the mobile device. Because the sides of the case or pouch are made of RF-transparent material, the mobile device can transmit and receive RF radiation signals through the sides to communicate with a cellular base station. Unfortunately, transmission and receiving RF radiation through the sides expose the mobile device user to RF radiation.

One problem with RF-blocking screens shown in U.S. Pat. No. 8,270,929, is that they require a grounding structure in constant contact with the body of the mobile device.

Also, if the mobile device is placed into a case with all sides made of RF/EMF-blocking material and an RF/EMF-blocking screen, the mobile device must be removed from the case to initiate a call or a text message. If the mobile device is removed from the case, the user is exposed to RF/EMF radiation. In addition, repeatedly inserting and removing the mobile device from the case is inconvenient.

What is needed is an improved shielding film that blocks or reduces RF/EMF radiation from the display on a mobile device, allows full 'touch functionality', and does not require a grounding structure. What is also needed is a case with RF/EMF blocking material that blocks or reduces RF/EMF radiation in multiple directions. Finally, what is also needed is a case that can be used with an optional multi-purpose wire that transmits and receives signals to and from other sources and easily connects to the mobile device when placed inside the case.

DISCLOSURE OF THE INVENTION

It is an object of the present invention to provide an improved shielding device that uses a transparent film attached to the display on a mobile device that blocks or reduces RF/EMF radiation from the display, and which does not require a ground structure that connects to the body of the mobile device.

Another object of the present invention is to provide an improved shielding device that uses such a transparent film with the above quality that allows full touchscreen functionality of the mobile device.

Another object of the present invention is to provide an improved shielding device that can be used with a case made of RF/EMF-blocking material.

It is a further object of the present invention to provide a shielding device and case that includes an optional multi-purpose wire that transmits and receives signals from a cellular base station or any other source and easily connects to the mobile device when placed inside the case.

The invention is a radiation shielding device that includes a transparent layer, called hereinafter a film layer embedded or covered with RF/EMF/ELF blocking material configured to absorb or deflect RF/EMF/ELF radiation. The film layer may be made of flexible, transparent plastic, glass, polyesters, polyvinyl chloride or acrylic, or other types of material. Formed on the film layer are partitions or gaps in which the blocking material is absent, thereby dividing the film layer's surface into a plurality of isolated blocking areas. The transparent film layer with blocking partitions is a single layer structure in one embodiment.

In another embodiment, the shielding device uses two identical film layers separated by an insulated layer. The film partitions or gaps on the two film layers are uniform and offset from the partitions or gaps on the other film layer, thereby creating overlapping blocking areas on the two film layers.

The two embodiments of the shielding device may be adhered or attached over the touchscreen display used on a mobile device or positioned inside an outer case configured to house a mobile device. The outer case may be made or covered on all sides with RF/EMF radiation-blocking material. When placed into the outer case, the case may include an optional multi-purpose wire that can also act as an antenna wire that connects at one end to the mobile device's charging/audio port when placed inside the outer case. The transparent film layer with blocking configurations could also be part of the mobile device's touchscreen. In other words, the film layer becomes part of the original equipment manufacturing. The case with multi-purpose wire may become part of the original equipment manufacturing.

The outer case may also include a pop-up grip handle mounted on the outer case's back surface. The pop-up handle includes an internal cavity where the multi-purpose wire may be stored.

BEST MODE FOR CARRYING OUT THE INVENTION

An RF/EMF emissions shielding device 60 in one embodiment comprises a single film layer 62 configured to be attached over the top surface 72 of a touchscreen display 71 on a mobile device 70 that emits RF radiation omnidirectionally.

In the first embodiment, the single film layer 62 is made of transparent material, such as plastic, glass, or PVC, embedded or covered with a radiation-blocking material 100 configured to absorb or deflect RF/EMF radiation. The radiation-blocking material 100 is arranged over the top surface (or embedded into) of the film layer 62 into a plurality of isolated, radiation-blocking areas 102. The radiation-blocking areas 102 are created by forming partition lines or gaps (hereinafter called partitions 104) evenly or randomized spaced apart on the radiation-blocking material 100.

Figure 4:
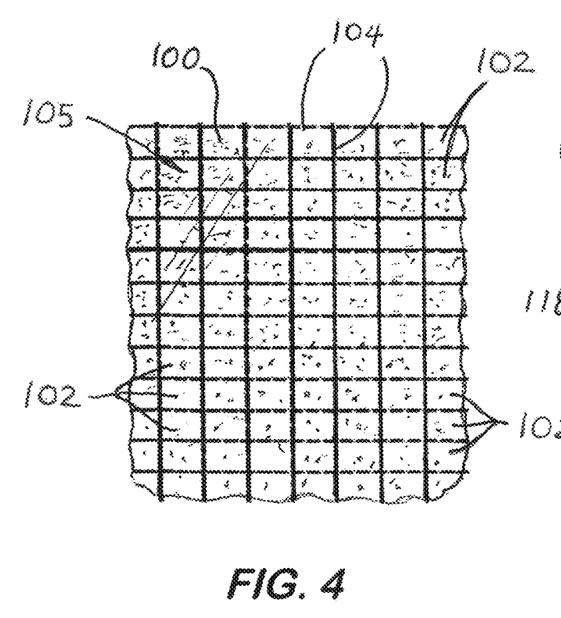
FIG. 4 is a partial top plan view of the single film shielding device shown in FIG. 2 that more clearly depicts the radiation-blocking areas and the partitions formed thereon.

As shown in FIG. 4, the partitions 104 are formed or arranged in a grid-like pattern 105 in the radiation-blocking material 100. As a result, square or rectangular-shaped radiation-blocking areas 102 are formed between the partitions 104. It should be understood that the arrangement of the partitions 104 is not limited to the grid-like pattern 105 shown with intersecting parallel horizontal and vertical lines. For example, the partitions 104 could be arranged in a wide range of different configurations and different sizes, creating different radiation-blocking area shapes. For example, partitions 104 could be arranged in triangles or hexagons that form triangular or hexagonal-shaped radiation-blocking areas (not shown).

Figure 2:
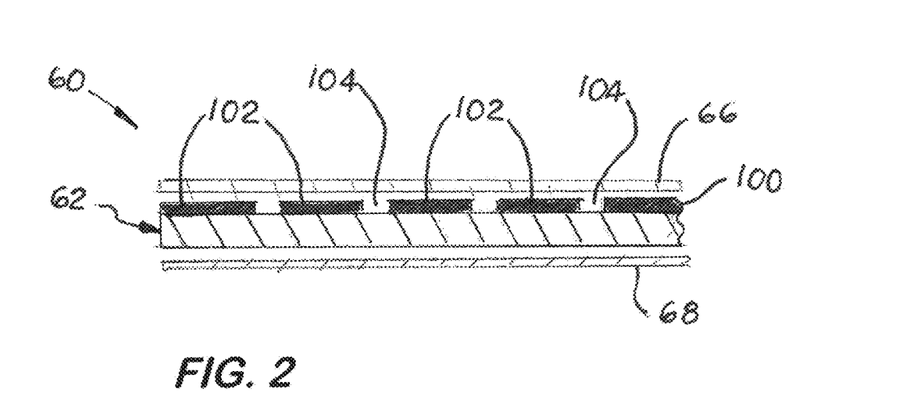
FIG. 2 is an exploded sectional, side elevational view of a single film shielding device.

In one embodiment, shown in FIG. 2, the shielding device 60 is a single film layer 62 with an optional top protective layer 66 disposed over the top surface of the film layer 62 to protect the radiation-blocking material 100. Also, an adhesive layer 68 may be applied to the bottom surface of the single film layer 62 to attach the single film layer 62 to the mobile device's touchscreen display 71.

Figure 3:
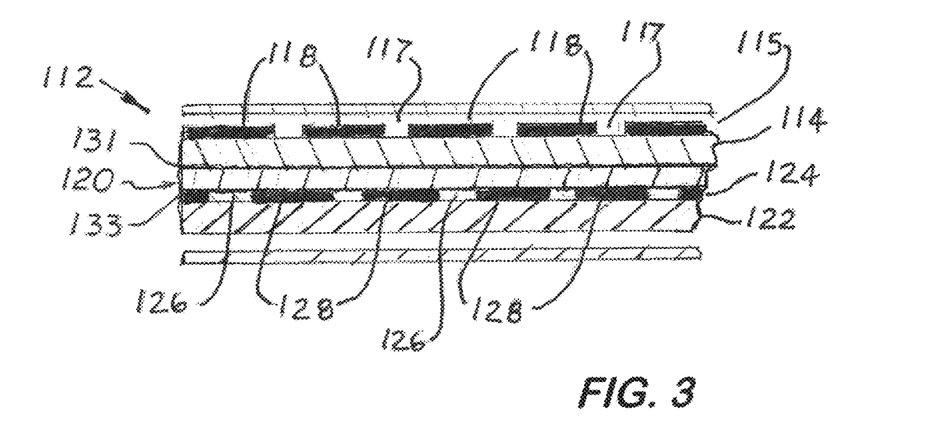
FIG. 3 is an exploded sectional, side elevational view three-layer film shielding device.

In another embodiment, the shielding device, indicated by reference number 112, includes the top film layer 114, identical to the film layer 62 described above with a radiation-block material 115 divided into radiation-block areas 118 with partitions 117 formed of non-radiation block material. In addition, located under the top film layer 114 is a transparent isolation layer 120.

Figure 5:
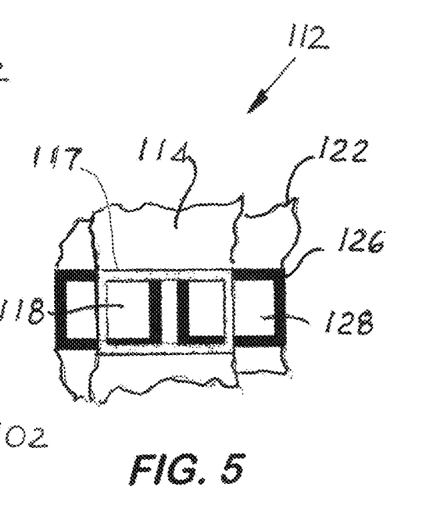
FIG. 5 is a partial top plan view of the three-layer film shield, depicting the offset partition formed on the top and bottom film layers.

Located under isolation layer 120 is a second film layer 122. Like film layer 114, the second film layer 122 includes a top surface covered with radiation-block material 124. The radiation-blocking material 124 on the second film layer 120 is divided into a plurality of isolated, radiation-blocking areas 128 identical to the radiation-blocking areas 118 formed on the top film layer 114. The radiation blocking areas 128 are formed by partitions 126 arranged in the same grid pattern on the top film layer 114. However, partitions 126 of the second film layer 122 are offset with the partitions 117 formed on the top film layer 114, thereby creating overlapping radiation-blocking areas 118, and 128 on the two film layers 114, and 122, respectively, when stacked. By stacking and offsetting the radiation-blocking areas 118, 128 on the two film layers 114, 122, respectively, the amount of radiation emitted by the mobile device 70 is reduced. FIG. 5 is a partial top plan view of the layer film shield 112, more clearly depicting the offset partitions formed on the top and bottom film layers.

Optional adhesive layers 131, 133 are placed over the top and bottom surfaces of the isolation layer 120 and are used to attach the isolation layer 120 to the top and bottom film layers 114, 122. In addition, an optional adhesive layer 135 may also be applied to the bottom surface of the second film layer 122 to attach the second film layer 122 to the mobile device's touchscreen display, not shown.

Figure 6:
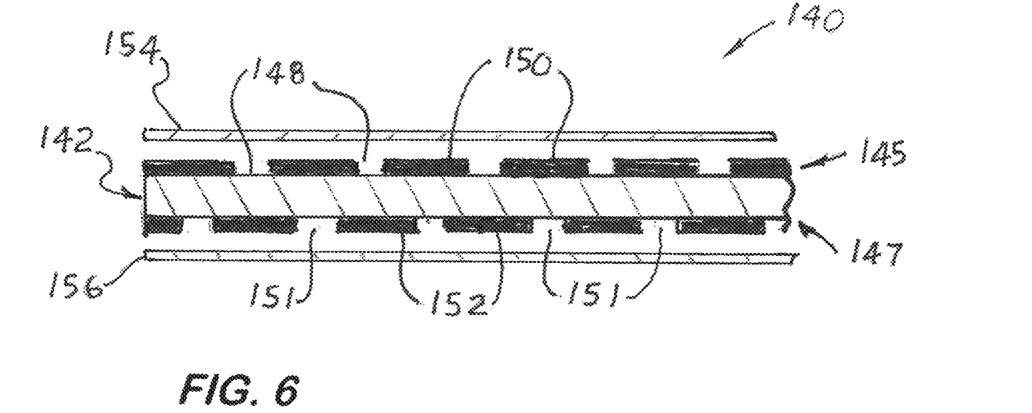
FIG. 6 is an exploded sectional side elevational view of a single film shielding device with offset partitions and radiation-blocking areas on opposite sides of the single film layer.

FIG. 6 shows a sectional side elevational view of another shielding device 140 that includes a film layer 142 with radiation-blocking materials 145, and 147, applied to the film layer's opposite top and bottom surfaces, respectively. The radiation block material 145, 147 is divided into radiation block areas 150, 152 with partitions 148, 151, respectively. By stacking and offsetting the radiation-blocking areas 150, 152 on opposite sides of the single film layer 142, the amount of radiation emitted by the mobile device 70 is reduced.

Optional protective layer 154 and adhesive layer 156 may be placed over the radiation-blocking areas 150 and 152, respectively.

Figure 7:
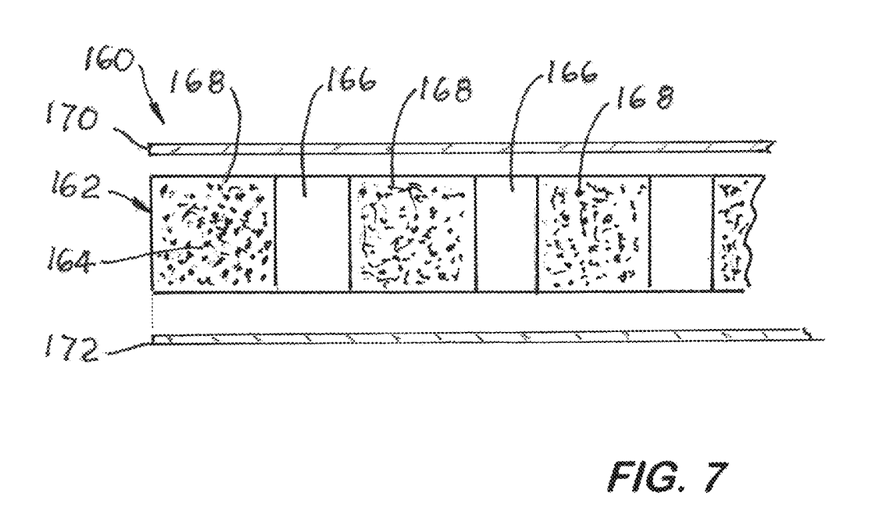
FIG. 7 is an exploded of a single film layer with radiation-blocking materials embedded into the film layer and aligned partitions, forming radiation-blocking areas.

FIG. 7 shows another embodiment of the shielding device 160, wherein the film layer 162 is embedded or column-like shapes 168 made of RF/EMF/ELF blocking material 164. Formed in the film layer 162 between the shapes 168 are partitions 166 in which the radiation-blocking material 164 is absent. The RF/EMF/ELF blocking material 164 and the partitions 166 extend from the film layer's top to bottom surfaces and divide the film layer 162 into a plurality of isolated radiation-blocking shapes 168.

Optional adhesive layers 170, 172 were placed over the top and bottom surfaces of the isolation layer film layer 162 to protect the ends of the shapes 168 made of radiation-blocking material.

The film layers are made of transparent plastic, polyester, or other transparent materials in the shielding devices described above. The film layers may also be made of glass. The radiation-blocking material is made of Nickel and Copper, although other types of material may be used. In all embodiments, the radiation-blocking areas formed on the film layers reduce or block RF/EMF radiation emitted from the mobile device's display. The amount of RF radiation reduced or blocked depends on the blocking material and its size and shape. The radiation-blocking or reducing properties of the radiation-blocking material can vary. Also, the lengths and widths of the partitions may vary.

It should also be understood that the film layers and radiation-blocking material may be part of the mobile device's touchscreen display.

Figure 1:
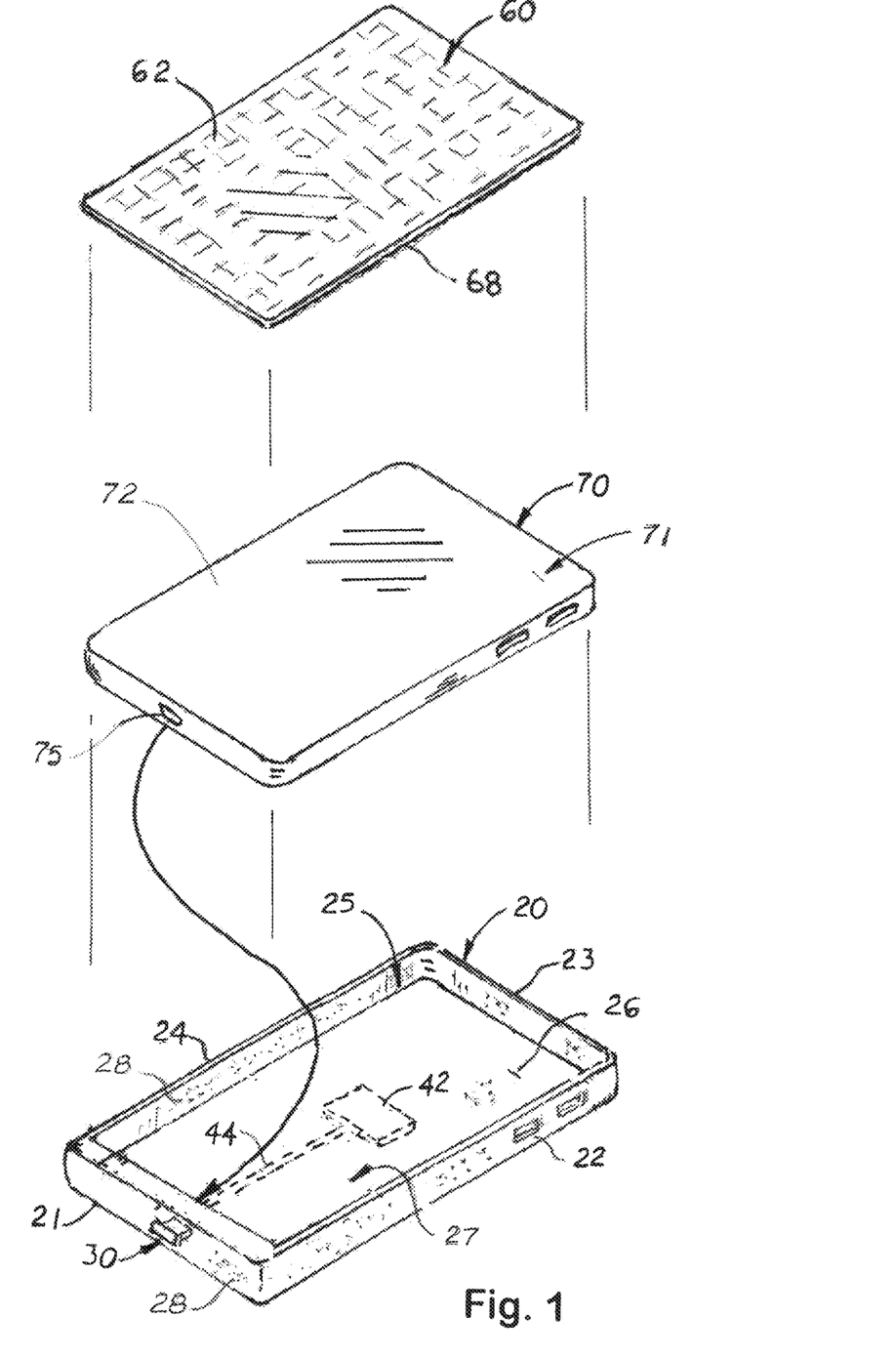
FIG. 1 is an exploded, perspective view of the shielding device that includes an RF/EMF radiation-blocking film layer positioned over the front touchscreen display on a mobile device and an outer case that fits around the mobile device, the outer case is made of RF/EMF shielding material, and may include a multi-purpose plate mounted on the back wall of the outer case device that connects to a connector that connects to the mobile device's charging port or it is in contact with the body of the mobile device when placed in the outer case. The case could have an opening or window (not shown in the drawing) to expose the camera or strengthen the signal reception.

The shielding devices 60, 112, 140, and 160 described above can all be used with an outer case 20, shown in FIG. 1. The outer case 20 includes a lower-end wall 21, a left-side wall 22, an upper-end wall 23, a right-side wall 24, a front opening 25, and a back wall 26. Formed inside the outer case 20 is a center void area 27 configured to receive a mobile device 70. In the embodiment shown in FIG. 1 the lower-end wall 21, the left side wall 22, the upper-end wall 23, the right-side wall 24, and the eek back wall 26 are covered with or made of RF/EMF radiation blocking material 28. It should be understood that one or more of the end walls or side walls may not be covered with RF/EMF radiation blocking material 28 or may be eliminated or modified to create openings in the outer case 20 to allow for RF/EMF radiation to be transmitted or received by the mobile device when placed inside the outer case 20.

The outer case 20 may include an optional multi-purpose wire 44 attached or embedded into the outer case's back wall 26. For example, one end of the multi-purpose wire 44 extends along the back wall 26 and may extend through the lower end wall 21 and terminates inside the center void area 27. Alternatively, the end of the multi-purpose wire 44 may be attached to a connector 30 mounted on the lower end wall 21. The end of the multi-purpose wire 44 and the connector 30 are configured to selectively attach to the charging/audio port 75 on a mobile device 70 or when in contact with the body of the mobile device 70 when placed in the outer case 20.

The exposed section of the multi-purpose wire 44 that extends outside the outer case 20 may act as an antenna wire and may have adapters for charging, headphones and/or other purposes.

Figure 8:
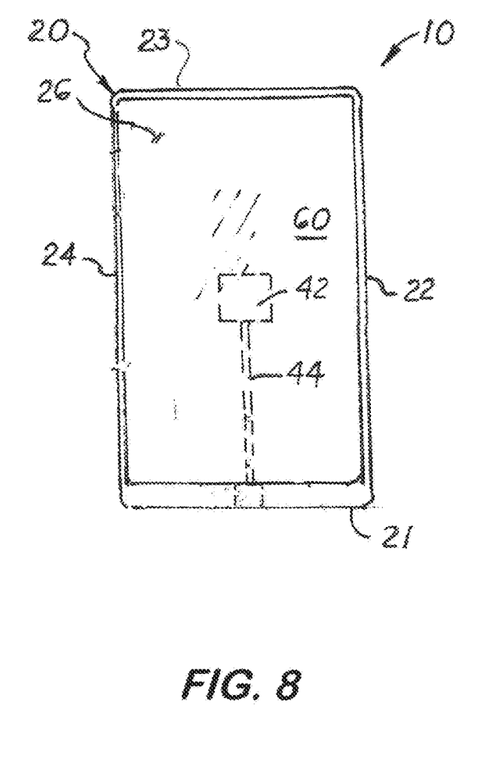
FIG. 8 is a top plan of the outer case with the mobile device removed.
Figure 9:
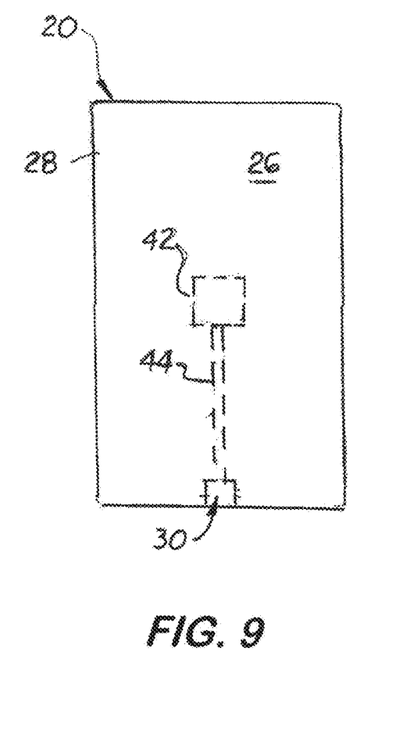
FIG. 9 is a bottom plan view of the outer case shown in FIG. 8.

FIGS. 8 and 9 are top plan and bottom plan views of the outer case 20 with the mobile device removed, showing an optional antenna 42 embedded into the back wall 26 of the outer case 20. The antenna 42 is not covered with radiation-blocking material and, therefore, can transmit and receive signals from a cellular base station. The multi-purpose wire 44 connects at one end to the antenna 42, extends along the back wall 26, and either extends directly into the center void area 27 or connects to connector 30. When a mobile device 70 is inserted into the center void area 27, the end of the multi-purpose wire 44 or connector 30 connects to the mobile devices' charging/audio port 75.

Figure 10:
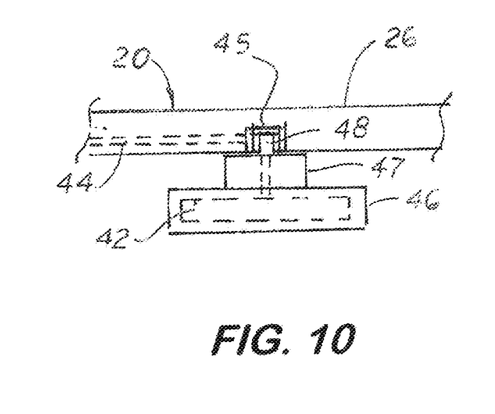
FIG. 10 is a partial sectional, side elevational view of the outer case showing a handle with an antenna formed therein that connects to a multi-purpose wire extending along the outer case's back wall.
Figure 11:
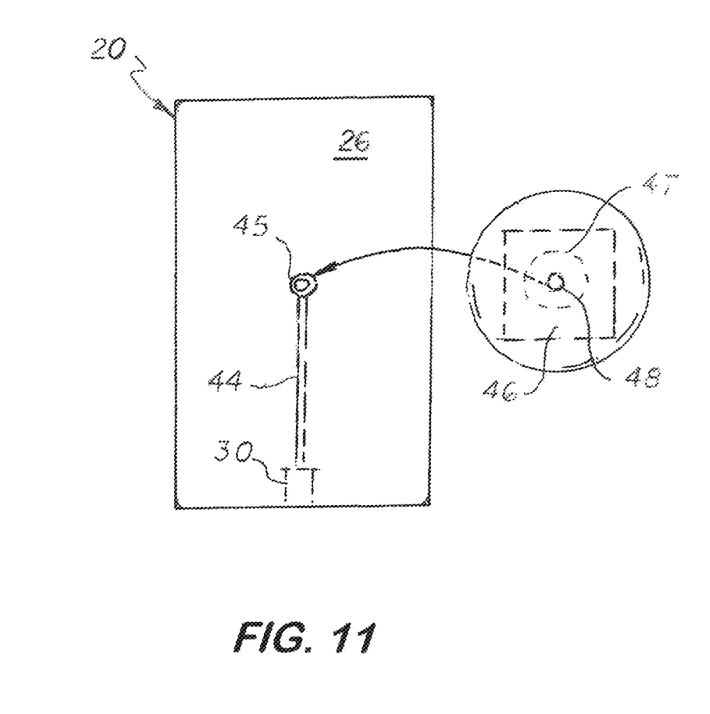
FIG. 11 is a bottom plan view of the outer case shown in FIG. 10, showing a handle snap connecting to a compatible connector affixed to the back wall on the outer case.

FIGS. 10 and 11 show side elevational views and rear plan views of the outer case 20 with the multi-purpose wire 44 extending along the back wall 26 and terminating at a connector 45 affixed to the back wall 26. A handle 46 with a built-in antenna 42 and a perpendicularly aligned neck 47. Extending longitudinally from the end of the neck 47 is a post 48 that selectively connects to the connector 45.

Figure 12:
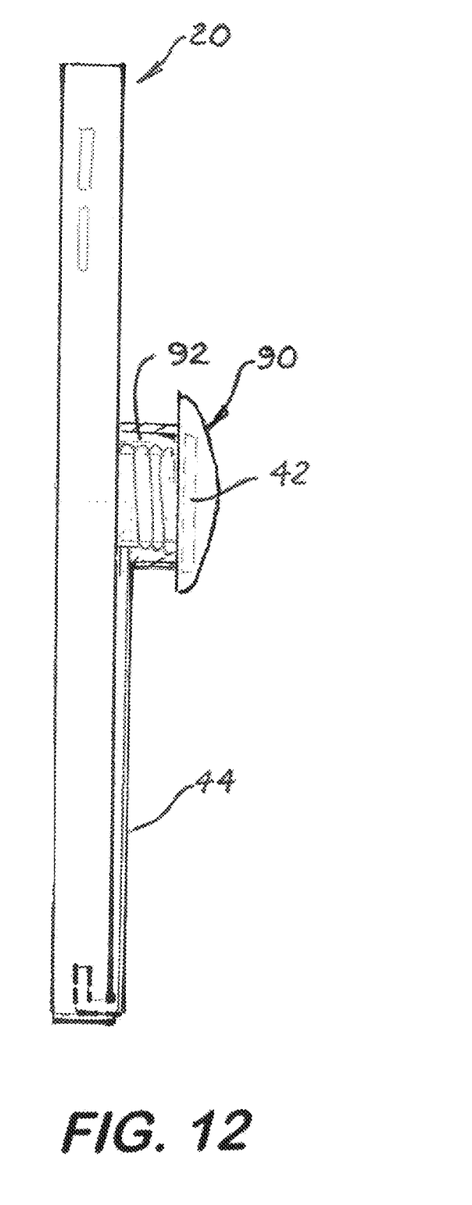
FIG. 12 is an alternative embodiment of the outer case with a pop-up handle mounted on the back wall of the outer case that includes a cavity in which the multi-purpose wire is stored.

FIG. 12 is an alternative embodiment of the outer case 20 with a pop-up handle 90 mounted on the back wall 26 that includes cavity 92, which is where the multi-purpose wire 44 is stored. Note: the multi-purpose wire 44 may not be limited to part of the back wall 26 of the outer case 20, it could be part of the other sides as well.

In compliance with the statute, the invention described has been described in language more or less specific as to structural features. It should be understood, however, that the invention is not limited to the specific features shown, since the means and construction shown, comprises the preferred embodiments for putting the invention into effect. The invention is therefore claimed in its forms or modifications within the legitimate and valid scope of the amended claims, appropriately interpreted under the doctrine of equivalents.

INDUSTRIAL APPLICABILITY

This invention has application in the mobile device industry. More specifically, with mobile devices that receive and transmit RF/EMF radiation that may be harmful to the user.

We claim:

1. An RF/EMF radiation shielding device for a mobile device with a touchscreen display that allows proper touchscreen functionality, comprising:
   a. a film layer configured to cover the touchscreen display on a mobile device, said film layer includes a top surface and a bottom surface, said film layer being made of a material sufficiently transparent to allow visibility of said touchscreen display used on said mobile device; and,
   b. a radiation-blocking material embedded or covering said film layer, said radiation-blocking material configured to block or attenuate RF/EMF radiation and,
   c. wherein said RF/EMF radiation-blocking material comprises a plurality of isolated radiation-blocking areas, each said radiation-blocking area being separated from each other by partitions in which said RF/EMF radiation-blocking material is absent.

2. The RF/EMF radiation shielding device, as recited in claim 1, wherein said partitions are arranged in a grid-like pattern.

3. The RF/EMF radiation shielding device, as recited in claim 2, further including an adhesive layer located on said bottom surface of said film layer.

4. The RF/EMF radiation shielding device, as recited in claim 1, further including an isolation layer aligned and registered and disposed under said film layer, and a second film layer made of transparent material-aligned and registered under said isolation layer, said second film layer includes a bottom surface with RF/EMF radiation blocking material embedded or covering said bottom surface of said second film layer, said second film layer includes partitions where said RF/EMF radiation-blocking material is absent, said partitions divided said RF/EMF radiation-blocking material into a plurality of isolated radiation blocking areas, said RF/EMF radiation-blocking material on said second film layer being offset axially from said RF/EMF radiation-blocking material on said film layer.

5. An RF/EMF radiation shielding device, as recited in claim 4, wherein said partitions are arranged in a grid-like pattern.

6. The RF/EMF radiation shielding device, as recited in claim 4, further including an adhesive layer located over said bottom surface of said second film layer.

7. The RF/EMF radiation shielding device, as recited in claim 1, further including an outer case configured to fit around said mobile device, said outer case includes a center void area configured to receive said mobile device, said outer case includes a back wall, a top opening, an upper end wall, a lower end wall and two opposite side walls, said back wall and said side panels walls being made or covered with RF/EMF radiation blocking material.

8. The RF/EMF radiation shielding device, as recited in claim 7, further including a multi-purpose wire embedded, attached or coupled to said outer case, said multi-purpose wire configured to connect to said mobile device.

9. The RF/EMF radiation shielding device, as recited in claim 8, further including a grip handle on said outer case.

10. The RF/EMF radiation shielding device, as recited in claim 9, wherein said grip handle is configured to store at least a part of the said multi-purpose wire.

11. The RF/EMF radiation shielding device, as recited in claim 8, wherein said multi-purpose wire is an antenna wire for said mobile device.

12. An RF/EMF radiation shielding device for a mobile device with a touchscreen display that receives and transmits RF/EMF radiation, comprising:
   a film layer configured to cover a touchscreen display on a mobile device, said film layer includes a top surface and a bottom surface, said film layer being made of RF/EMF non-blocking material and being sufficiently transparent to allow visibility of said touchscreen display, said film layer includes;
   a plurality of shapes made of RF/EMF radiation-blocking material extending from said top surface to said bottom surface of said film layer; and,
   wherein said RF/EMF radiation-blocking material being configured into a plurality of isolated radiation-blocking areas separated from each other by areas in which said RF/EMF radiation-blocking material is absent.

13. The RF/EMF radiation shielding device as recited in claim 12, further including an adhesive on said bottom surface of said film layer.

14. The shielding device as recited in claim 12, further including an outer case with at least one panel covered completely or partially with RF/EMF radiation-blocking material.

15. An RF/EMF radiation shielding device for a mobile device with a touchscreen display that receives and transmits RF/EMF radiation, comprising:
   a. a film layer configured to cover a touchscreen display on a mobile device, said film layer includes a top surface and a bottom surface, said film layer is made of material sufficiently transparent to allow visibility of said touchscreen display when said film layer is placed over said touchscreen display; and,
   b. a plurality of radiation-blocking areas each made of RF/EMF radiation-blocking material located on said top surface and said bottom surface of said film layer, said radiation-blocking areas on said top surface and said bottom surface being separated from each other by areas of said film layer in which said RF/EMF radiation-blocking material is absent.

16. The RF/EMF radiation shielding device, as recited in claim 15, further including a protective layer located on said top surface of said film layer.

17. The RF/EMF radiation shielding device, as recited in claim 16, wherein said RF/EMF radiation-blocking areas on said top surface on said film layer are offset from said RF/EMF radiation-blocking areas on said bottom surface of said film layer.

18. The RF/EMF radiation shielding device, as recited in claim 15 further including an adhesive layer located on said bottom surface of said film layer.

19. The RF/EMF radiation shielding device, as recited in claim 15, further including an outer case configured to fit around said mobile device, said outer case includes a center void area configured to receive said mobile device, said outer case includes a back wall, an upper-end wall, a lower end wall, and two opposite side panels, at least one of said upper-end wall, said lower end wall, and said side panels being made of or covered with RF/EMF radiation blocking material.

20. The RF/EMF radiation shielding device, as recited in claim 19, further including at least one multi-purpose wire mounted on said outer case that selectively attaches to said mobile device when placed inside said center void area, said multi-purpose wire configured to act as an antenna wire.

21. The RF/EMF radiation shielding device, as recited in claim 15, wherein said radiation-blocking areas on said top surface on said film layer are offset from said radiation-blocking areas on said bottom surface of said film layer.

* * * * *